United States Patent [19]

Geka

[11] Patent Number: 4,652,147
[45] Date of Patent: Mar. 24, 1987

[54] DIRECTION TURNING PASSAGE OF ROLLING BEARING FOR RECTILINEAR MOTION

[75] Inventor: Toshiaki Geka, Chiba, Japan
[73] Assignee: Nippon Thompson, Co., Ltd., Tokyo, Japan
[21] Appl. No.: 876,184
[22] Filed: Jun. 19, 1986

[30] Foreign Application Priority Data

Jul. 1, 1985 [JP] Japan ................................ 60-142543

[51] Int. Cl.$^4$ ............................................ F16C 29/06
[52] U.S. Cl. ...................................... 384/43; 384/45
[58] Field of Search .............................. 384/7, 43–45

[56] References Cited

U.S. PATENT DOCUMENTS 3,245,731  4/1966  Erikson .................. 384/45
4,505,522  3/1985  Tanaka .................... 384/45
4,556,262  12/1985  Geka ..................... 384/44

Primary Examiner—Stuart S. Levy
Assistant Examiner—Thomas R. Hannon
Attorney, Agent, or Firm—Trexler, Bushnell & Wolters, Ltd.

[57] ABSTRACT

There is a direction turning passage of a rolling bearing for a rectilinear motion comprising: a track member and a slide member which are slidably come into engagement with each other between first and second track surfaces formed in the track and slide members through rolling members. The direction turning passage in the slide member adapted to turn the direction of the rolling members along a curved line is formed by the curves having two or more kinds of curvatures so as to be continuous with the track to which a bearing load is applied, and the first portion at the nearest location of the track side is formed so that its curvature is smaller than that of the second portion subsequent thereto. The direction turning passage in the slide member, on one hand, may be formed by the arcs having two or more kinds of radii and the first arc at the nearest location of the track side is formed larger than the second arc subsequent to the first arc, or it may be formed by an ellipse in which at least the track side is a minor axis. With this arrangement, the overall bearing size can be made small and the slide resistance of the bearing becomes small.

3 Claims, 10 Drawing Figures

DIRECTION TURNING PASSAGE OF ROLLING BEARING FOR RECTILINEAR MOTION

BACKGROUND OF THE INVENTION

1. Field of the Invention

The present invention relates to a direction turning passage of a rolling bearing for an infinite rectilinear motion and, more particularly, to a direction turning passage in which the movement of rolling members from the track groove to the direction turning passage is made smooth and thereby enabling the slide resistance of the bearing to be reduced.

2. Description of the Prior Art

Hitherto, in slide members, rolling members which have passed through the track serving as a load range of the rolling members are led to an arc-like direction turning passage consisting of a uniform radius and are moved to a return passage set in parallel with the track.

It is obvious from the Official Gazette of Japanese Patent Application No. 245933/1983 filed previously by the same applicant as this invention that the movement of the rolling members in the infinite circulating passage becomes smooth as the radius of the arc of the direction turning passage is increased.

However, in case of actually designing bearings, there is a limitation of a size of the bearing and as the radius of the arc of the direction turning passage increases, the width of the bearing and the length in the direction of the axis are also enlarged, so that the radius of the arc is unconditionally limited and determined. Consequently, this also results in a limitation of the reduction of the slide resistance between the direction turning passage and the track.

Recently, a number of bearings for a rectilinear motion have been used in the industries relative to the mechanical/electronical fields and at the same time, smaller-sized bearings for a rectilinear motion having smaller slide resistances are demanded. In such a situation, it is a large subject to reduce the slide resistance.

In general, the rolling members which enter the direction turning passage from the straight track strike the outside wall surface of the direction turning passage and the moving direction is changed. Thus, as the rake angle adapted to guide the rolling members becomes small, the resistance at this time is reduced. In other words, the resistance becomes small with an increase in the radius of the outer periphery of the direction turning passage. However, on the contrary, a problem such that the width and length of the bearing become large is caused.

SUMMARY OF THE INVENTION

It is an object of the present invention to provide a direction turning passage of a rolling bearing for a rectilinear motion in which the radius of the arc of the direction turning passage is set to the largest possible value in the limited space of the bearing without changing the width of the bearing and the length in the direction of the axis, thereby making the motion of the rolling members in the infinite circulating passage smooth and enabling the slide resistance of the bearing to be reduced.

This object is accomplished by a direction turning passage of a rolling bearing for a rectilinear motion comprising: a track member in which the first track surface is formed in the longitudinal direction of an axis or rail shape; and a slide member in which the second track surface is formed at the position corresponding to the first track surface and at the same time a passage adapted to infinitely circulate rolling members is formed continuously with the first and second track surfaces, wherein both of the track member and slide member are slidably come into engagement with each other between the first and second track surfaces through rolling members.

The direction turning passage of the present invention has either of the following features:

(1) The direction turning passage in the slide member to turn the direction of the rolling members along a curved line is formed by the curves having two or more kinds of curvatures so as to be continuous with the track to which the bearing load is applied. The first portion at the nearest location of the track side is formed so that its curvature is smaller than that of the second portion subsequent to the first portion.

(2) The direction turning passage in the slide member is formed by the arcs having two or more kinds of radii. The first arc at the nearest location of the track side is formed larger than the second arc subsequent to the first arc.

(3) The direction turning passage in the slide member is formed by an ellipse in which at least the track side is a minor axis.

DETAILED DESCRIPTION OF THE PREFERRED EMBODIMENTS

An embodiment of the present invention will now be described in detail hereinbelow with reference to the drawings.

Figure 1A:
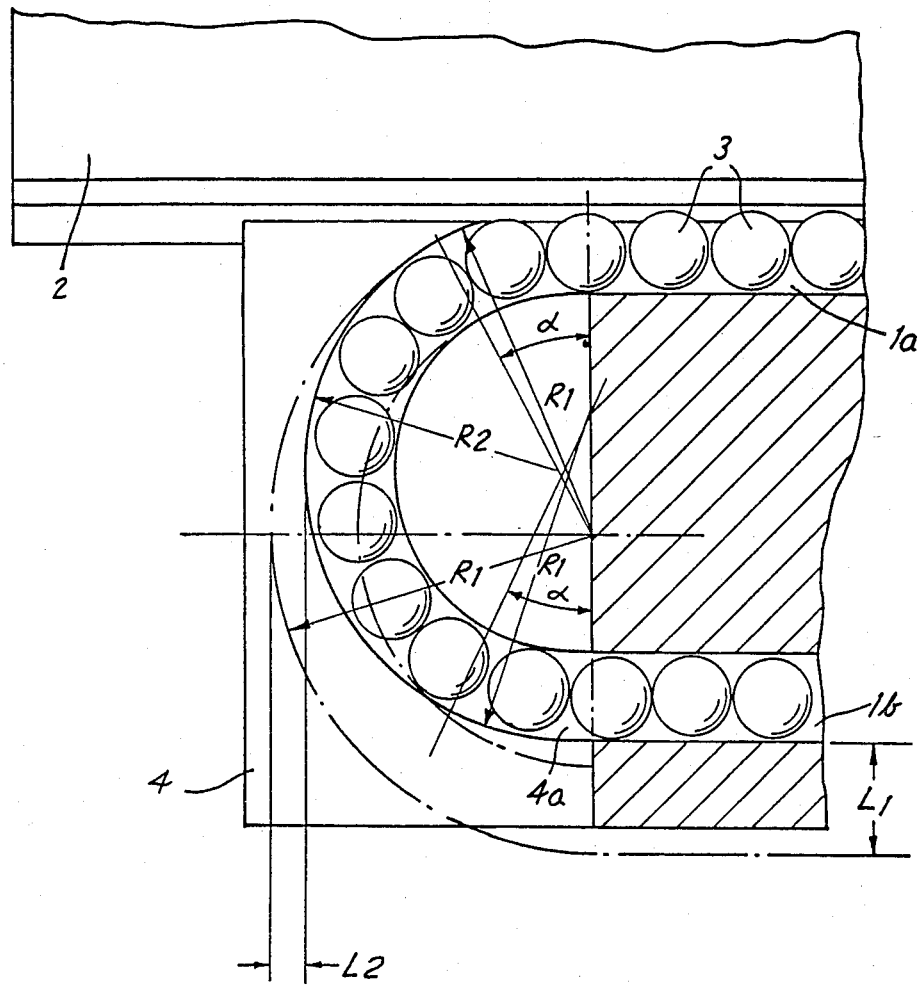
FIG. 1A is a cross sectional view showing the first embodiment of the present invention.
Figure 3:
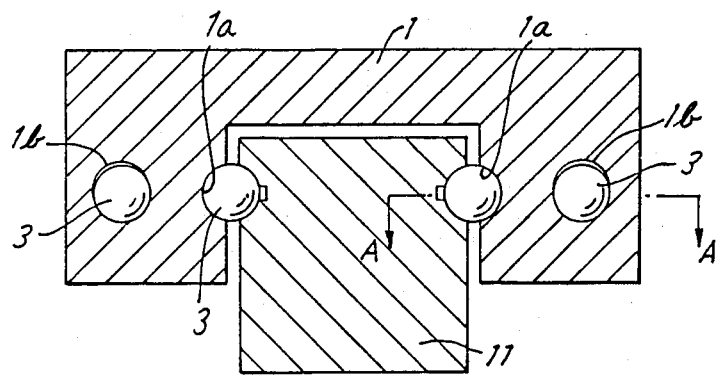
FIGS. 3, 4, 5, 8A, and 8B are schematic explanatory diagrams illustrating various kinds of bearings to which the invention can be applied.

FIG. 3 is a schematic diagram to explain a preferred embodiment of the present invention. FIG. 1A is a cross sectional view showing the first embodiment of the invention taken along the line A—A in FIG. 3. In the diagrams, there is shown an example of the bearing which is constituted such that the track surface and the return passage are formed on the same plane. Reference numeral 1 denotes a casing, 2 is a track rail and 3 indicates balls. A track groove $1a$ and a return hole $1b$ are formed in parallel in the casing 1. Side plates 4 are attached to both sides of the track groove $1a$ and return hole $1b$. A direction turning passage $4a$ is formed in each side plate 4. The direction turning passage $4a$ is constituted in a manner such that the first outer peripheral arcs each having a radius $R_1$ are respectively formed from the edge surface of the track groove $1a$ and from the edge surface of the return hole $1b$, namely, the return passage by a range of an angle of $\alpha$ (about 30°) and then the second outer peripheral arc having a radius $R_2$ smaller than $R_1$ is continuously formed between those first arcs, as shown in FIG. 1A. In the diagram, $L_1$ denotes a decrease amount in the direction of width as compared with a conventional direction turning passage constituted by a single arc of the radius $R_1$, while $L_2$ likewise represents a decrease amount in the direction of slide axis. It will be appreciated that the direction turning passage according to the present invention can be constituted smaller than a conventional one.

FIG. 1 relates to an example whereby the dimensions of the direction turning passage can be reduced by only the length of $L_2$ in the slide direction and the length of $L_1$ in the width direction. In the diagram, the direction turning passage is symmetrical with respect to the upper and lower sides.

In addition to the above-mentioned constitution of FIG. 1A, as an applied form of the present invention, it is also possible to constitute the direction turning passage in a manner such that the first arc on the track groove side of the direction turning passage 4a and the first arc on the return passage side of the passage 4a can be asymmetrically formed. For example, if the angle $\alpha$ on the return passage side is set to be larger and the third arc of a radius $R_3$ which is smaller than the radius $R_1$ is formed continuously with the second arc of the radius $R_2$, the width on the return passage side can be made smaller.

On one hand, if the range of the first arc (angle of $\alpha$) near the track surface is too large, the size of the direction turning passage becomes large. Contrarily, if the range is too small, the effect of the invention cannot be expected. Therefore, the angle $\alpha$ may be properly set in dependence on the specifications of the bearing.

Figure 1B:
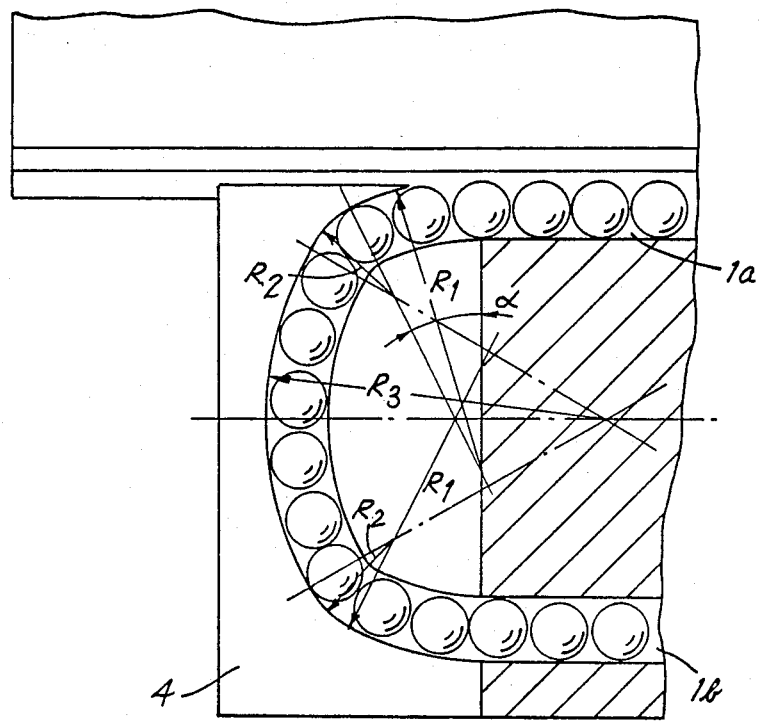
FIG. 1B is a cross sectional view showing a modified form of FIG. 1A.

FIG. 1B illustrates a modified form of FIG. 1A. In this modification, the direction turning passage 4a is formed by the first, second and third arcs respectively having the radii $R_1$, $R_2$ and $R_3$ so as to become symmetrical with regard to the sides of the track groove 1a and return passage 1b. With this arrangement, the direction turning passage of FIG. 1B has the further smaller size than that of FIG. 1A.

Briefly speaking, it is an essential point of the constitution requirements of the present invention that the arc (i.e., first arc) at the nearest location of the track surface is formed by an arc which is larger than the next arc (i.e., second arc). When this point is expressed by use of the reference characters of the radii of the direction turning passage in the diagrams, it will be summarized such that "the direction turning passage of the invention has at least the relationship of $R_1 > R_2$". Thus, the size of the overall direction turning passage becomes small and the slide resistance is reduced.

Although the direction turning passage is formed by two or three kinds of arcs as shown in FIG. 1A or 1B, it may be formed by a plurality of kinds of arcs and in such a case, the similar effect can be also derived.

Figure 2:
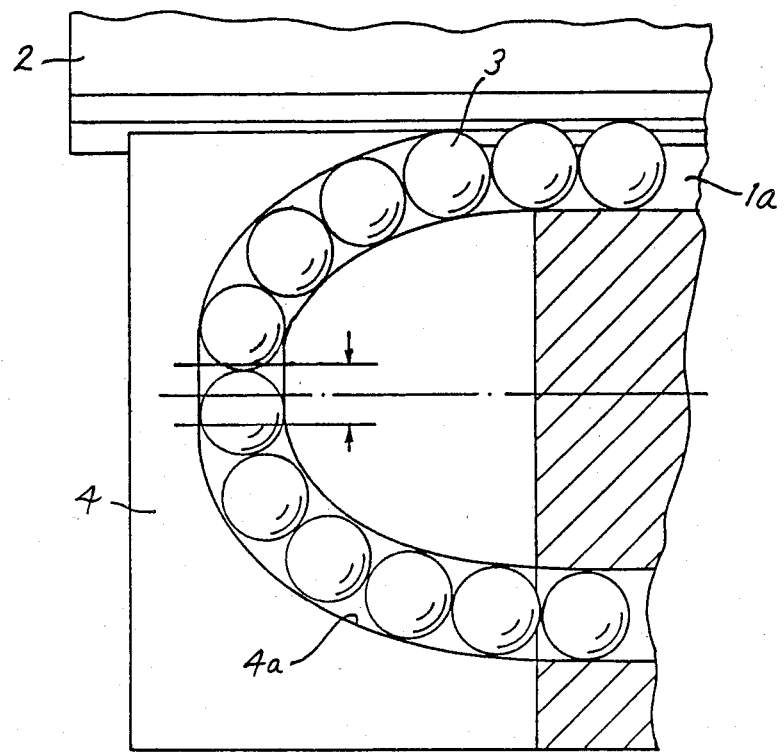
FIG. 2 is a cross sectional view showing the second embodiment of the invention.

FIG. 2 shows the second embodiment of the invention, in which the direction turning passage 4a is formed using two parts of an ellipse in place of a plurality of arcs.

FIG. 3 is a schematic diagram to explain a ball bearing for a rectilinear motion with Gothic arch grooves, which is used in the foregoing first embodiment, modified form thereof, and second embodiment of the invention.

Figure 4:
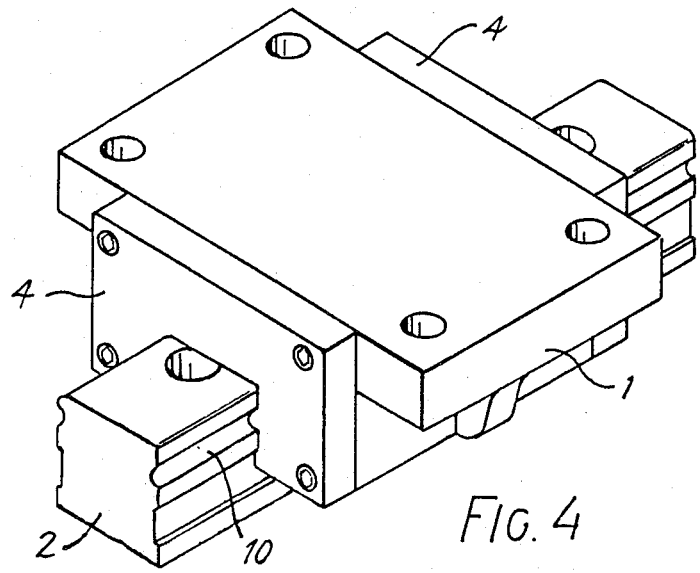
Figure 5:
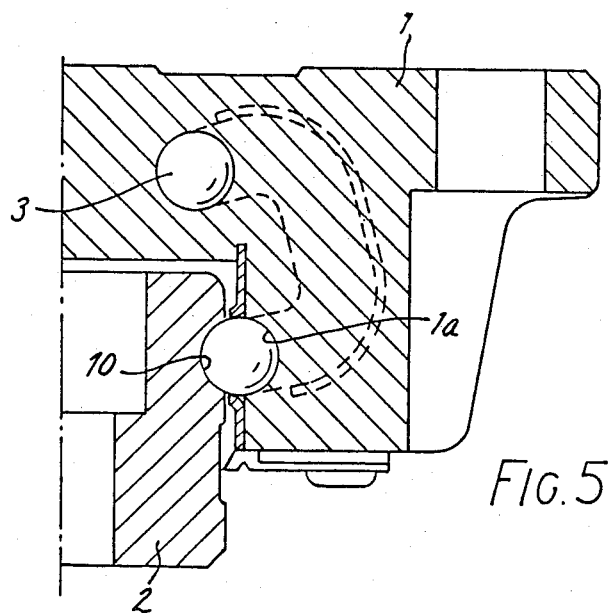

Although the track surface and the return passage are formed on the same plane in FIG. 3, the bearing shown in FIGS. 4 and 5 is constituted such that the return passage is formed almost immediately over the track groove. Practically speaking, in the diagrams, the direction turning passage is formed in a manner such that the shapes near the track and return passage of the direction turning passage formed in the side plate 4 become the shape near the track as shown in FIG. 1 or 2 when they are seen from the direction perpendicular to the line M—M in FIG. 5.

Figure 6:
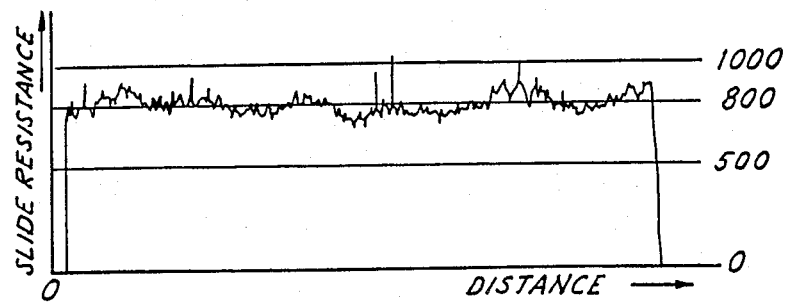
FIGS. 6 and 7 are graphs showing the results of experiments.
Figure 7:
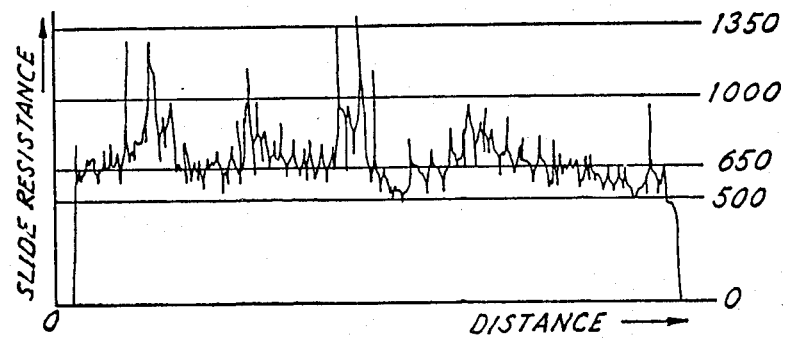

FIGS. 6 and 7 are graphs showing the results of experiments of the measurement of the slide resistances of the bearing shown in FIGS. 4 and 5 in the cases where the present invention is applied to the direction turning passage and where the direction turning passage is constituted by a single arc as in a conventional bearing under the condition whereby the other parts are the same. FIG. 6 is the graph showing the result according to the present invention. FIG. 7 is the graph showing the result in case of a conventional example. It will be understood from these graphs that according to the invention, a magnitude of the stick slip and a frequency of occurrence thereof are reduced as compared with the conventional example.

Figure 8A:
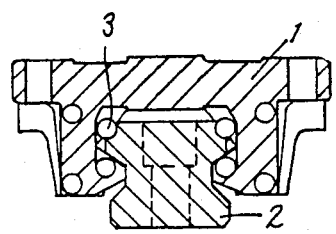
Figure 8B:
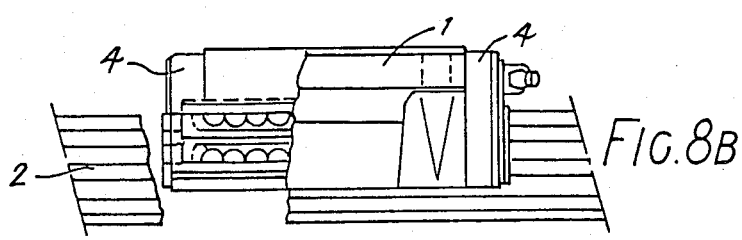

Although the balls come into contact with the track surface at four points in case of the bearings described in conjunction with FIGS. 1A to 5, the present invention may be applied to the bearing in which the balls come into contact with the track surface at two points as shown in FIGS. 8A and 8B.

Although not shown, the invention can be also applied to various kinds of similar bearings such as a ball bushing bearing, a ball spline bearing, etc. among the bearings using rollers or balls as rolling members.

As described above, according to the direction turning passages of the present invention, the following effects are obtained.

(1) The dimensions of the width and length of the direction turning passage can be set to the possible minimum values in the limited space.

(2) The bearing size can be reduced.

(3) The rolling members can smoothly enter the direction turning passage and the slide resistance of the bearing is small.

(4) The length in the slide direction of the direction turning passage can be reduced and the length of the track surface of the slide member can be made long, so that the load capacity of the bearing can be increased.

Although the present invention has been shown and described with respect to preferred embodiments, various changes and modifications which are obvious to a person skilled in the art to which the invention pertains are deemed to lie within the spirit and scope of the invention.

What is claimed is:

1. A direction turning passage of a rolling bearing for a rectilinear motion comprising:
   a track member in which a first track surface is formed in the longitudinal direction of an axis or rail shape; and
   a slide member in which a second track surface is formed at a location corresponding to said first track surface and a passage adapted to infinitely circulate rolling members is formed continuously with said first and second track surfaces;
   said track member and said slide member being slidably come into engagement with each other through said rolling members between said first and second track surfaces,
   wherein a direction turning passage in said slide member to turn the direction of the rolling members along a curved line is formed by curves having two or more kinds of curvatures so as to be continuous with a track to which a bearing load is applied, and at the same time the first portion at the nearest location of said track side is formed such that its curvature is smaller than that of the second portion subsequent to said first portion.

2. A direction turning passage according to claim 1, wherein the direction turning passage in said slide member is formed by arcs having two or more kinds of radii, and the first arc at the nearest location of the track side is formed larger than the second arc subsequent to said first arc.

3. A direction turning passage according to claim 1, wherein the direction turning passage in said slide member is formed by an ellipse in which at least the track side is a minor axis.

* * * * *